United States Patent
Katsuhara et al.

(10) Patent No.: US 10,115,543 B2
(45) Date of Patent: Oct. 30, 2018

(54) KEYBOARD COVER AND ELECTRONIC APPARATUS

(71) Applicant: Sony Corporation, Tokyo (JP)

(72) Inventors: Tomoko Katsuhara, Kanagawa (JP); Hiroto Kawaguchi, Kanagawa (JP); Akira Ebisui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/644,666

(22) Filed: Mar. 11, 2015

(65) Prior Publication Data

US 2015/0270076 A1    Sep. 24, 2015

(30) Foreign Application Priority Data

Mar. 20, 2014    (JP) ................. 2014-059020

(51) Int. Cl.
*B41J 5/00* (2006.01)
*H01H 13/85* (2006.01)
*G06F 3/02* (2006.01)

(52) U.S. Cl.
CPC .............. *H01H 13/85* (2013.01); *G06F 3/02* (2013.01); *H01H 2209/068* (2013.01); *H01H 2215/054* (2013.01); *H01H 2221/002* (2013.01); *Y10T 428/24355* (2015.01)

(58) Field of Classification Search
CPC ........................................................ G03F 3/02
USPC ........................................................ 400/491
See application file for complete search history.

(56) References Cited

U.S. PATENT DOCUMENTS

| | | | | |
|---|---|---|---|---|
| 4,421,966 A | * | 12/1983 | Pounds ................. | H01H 13/702 200/302.1 |
| 4,436,965 A | * | 3/1984 | Morse ..................... | H04M 1/23 200/302.2 |
| 4,604,605 A | * | 8/1986 | Meyers .............. | G07C 9/00674 200/333 |
| 4,940,346 A | * | 7/1990 | Liljenquist ................ | B41J 5/10 400/472 |
| 5,021,638 A | * | 6/1991 | Nopper ................. | G06F 3/0202 200/302.2 |
| 5,383,643 A | * | 1/1995 | Koch .................... | A47B 23/044 248/447 |
| 5,695,859 A | * | 12/1997 | Burgess ................ | H01H 1/029 200/85 R |
| 6,322,875 B1 | * | 11/2001 | Kimura ..................... | B44F 1/14 428/195.1 |
| 6,752,631 B2 | * | 6/2004 | Schwarzkopf ......... | G09B 13/04 235/145 R |
| 8,206,047 B1 | * | 6/2012 | Isaac ................... | G06F 3/04886 400/472 |
| 8,913,031 B2 | | 12/2014 | Honda et al. | |

(Continued)

*Primary Examiner* — Anthony Nguyen
(74) *Attorney, Agent, or Firm* — Wolf, Greenfield & Sacks, P.C.

(57) ABSTRACT

There is provided a keyboard cover including a first sheet material having a surface including a plurality of key tops configured of roughened surfaces and a base configured of a smooth surface connecting a plurality of the key tops, a plurality of the key tops being projected from the base viewed from the surface; and a second sheet material covering a rear surface of the first sheet material and having concave parts corresponding to a plurality of the key tops viewed from the rear surface. Also provided is an electronic apparatus, including a keyboard body and the keyboard cover.

2 Claims, 9 Drawing Sheets

(56) References Cited

U.S. PATENT DOCUMENTS

| | | |
|---|---|---|
| 9,310,200 B2 | 4/2016 | Kabasawa et al. |
| 9,664,947 B2 | 5/2017 | Kawaura |
| 9,760,183 B2 | 9/2017 | Kawaguchi et al. |
| 2002/0018983 A1* | 2/2002 | Dixon .................. G09B 13/02 434/227 |
| 2009/0322568 A1* | 12/2009 | Yoshida ................ H01H 13/83 341/22 |
| 2010/0232861 A1* | 9/2010 | Shibata ................ G06F 1/1662 400/491 |
| 2011/0175845 A1 | 7/2011 | Honda et al. |
| 2011/0240989 A1 | 10/2011 | Sekine et al. |
| 2011/0267274 A1* | 11/2011 | Shusteri ............... G06F 3/0219 345/168 |
| 2012/0113071 A1 | 5/2012 | Kawaguchi et al. |
| 2013/0076994 A1 | 3/2013 | Kawaura |
| 2013/0129398 A1* | 5/2013 | Koepke ................ H01H 13/85 400/491 |
| 2014/0007682 A1 | 1/2014 | Kabasawa et al. |
| 2015/0277626 A1 | 10/2015 | Shinkai et al. |
| 2015/0280708 A1 | 10/2015 | Goto et al. |
| 2015/0346839 A1 | 12/2015 | Kawaguchi et al. |
| 2015/0363023 A1 | 12/2015 | Kawaguchi et al. |
| 2016/0011691 A1 | 1/2016 | Shinkai et al. |
| 2016/0026297 A1 | 1/2016 | Shinkai et al. |
| 2016/0202800 A1 | 7/2016 | Itaya et al. |
| 2016/0294388 A1 | 10/2016 | Kawaguchi et al. |

* cited by examiner

KEYBOARD COVER AND ELECTRONIC APPARATUS

CROSS REFERENCE TO RELATED APPLICATIONS

This application claims the benefit of Japanese Priority Patent Application JP 2014-059020 filed Mar. 20, 2014, the entire contents of which are incorporated herein by reference.

BACKGROUND

The present technology relates to a keyboard cover placed on a keyboard, and an electronic apparatus including the same.

For example, an electronic apparatus such as a personal computer includes a keyboard as an input operation unit. In the related art, a variety of approaches for this type of keyboard has been made in order to improve operability or an operational feeling.

For example, Japanese Patent Application Laid-open No. 2003-141575 describes a key top member formed of a laminate where a non-woven fabric is in close contact with a thermoplastic resin film and the non-woven fabric is a pressing surface. It is suggested that such a configuration can provide a natural-like texture and a soft touching feel and that a texture and an appearance design that has not been attained by the known key pad for a push button switch.

Japanese Patent Application Laid-open No. 2010-10019 describes a key sheet including a skin layer providing a soft touching feel upon pressing operation and a porous layer disposed at a rear side of the skin layer and slightly depressed upon pressing.

SUMMARY

In recent years, in the field of the keyboard, further improvements of operability and an operational feeling are sought. Specifically, there is sought an improvement of key discrimination upon touch typing, prevention of mishits, adequate feedback upon inputting and alleviation of fatigue caused by a long time use.

In view of the circumstances as described above, there is a need for providing a keyboard cover and an electronic apparatus having improved operability and operational feeling.

According to an embodiment of the present technology, there is provided a keyboard cover including a first sheet material and a second sheet material.

The first sheet material has a surface including a plurality of key tops and a base. A plurality of the key tops is configured of roughened surfaces and are projected from the base viewed from above. The base is configured of a smooth surface and connects a plurality of the key tops.

The second sheet covers a rear surface of the first sheet material, and has concave parts corresponding to a plurality of the key tops viewed from the rear surface.

By the above-described configuration, the touching feels of the key tops and the base are different such that key discrimination upon touch typing is improved, the key tops are protruded from the base such that mishits are prevented. In addition, deformability of the key tops in a depressing direction is high such that adequate feedback can be provided upon inputting. Furthermore, the key tops have the touching feel of an artificial leather such that fatigue caused by a long time use can be alleviated.

According to an embodiment of the present technology, there is provided an electronic apparatus including a keyboard body and a keyboard cover.

The keyboard body includes a plurality of input keys.

The keyboard cover includes a first sheet material and a second sheet material.

The first sheet material has a surface including a plurality of key tops and base. A plurality of the key tops is configured of roughened surfaces and are projected from the base viewed from above. The base is configured of a smooth surface and connects a plurality of the key tops.

The second sheet covers a rear surface of the first sheet material, and has concave parts corresponding to a plurality of the key tops viewed from the rear surface.

The keyboard cover is disposed on the keyboard body.

According to the present technology, operability and an operational feeling can be improved.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

Figure 1:
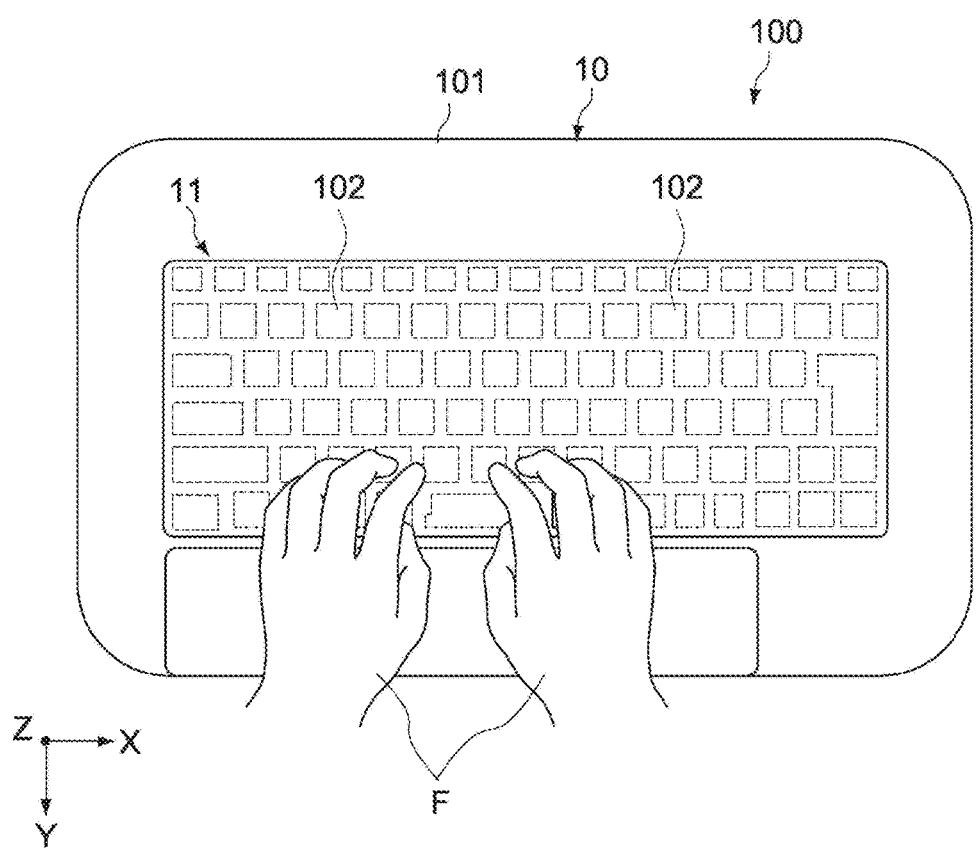
FIG. 1 is a schematic plan diagram showing a configuration of an electronic apparatus according to an embodiment of the present technology.

FIG. 1 is a schematic plan diagram showing a configuration of an electronic apparatus according to an embodiment of the present technology. In FIG. 1, an X axis direction represents a horizontal direction, an Y axis direction represents a vertical direction, and a Z axis direction represents a height direction orthogonal to the X axis direction and the Y axis direction.

[Electronic Apparatus]

An electronic apparatus 100 according to the embodiment configures a keyboard (input apparatus) generally used for a personal computer. The electronic apparatus 100 includes a keyboard body 10 and a keyboard cover 11.

The keyboard body 10 includes a housing 101 and a key arrangement including a plurality of input keys 102. A plurality of the input keys 102 is generally composed of depressing operational buttons and is input-operated by user's hands (fingers) F.

The depressing input keys 102 disposed at the keyboard body 10 may be mechanical contact type input keys or electrostatic type input keys that an operation position and a depressed amount can be electrostatically detected.

By the key arrangement according to the embodiment, a plurality of rows of the input keys 102 in parallel with the horizontal direction (X axis direction) is arranged in the vertical direction (Y axis direction), and the input keys 102 belonging to one row are shifted horizontally to the other input keys 102. A shift amount of the input keys 102 is smaller than arrangement pitches of the input keys 102 in the horizontal direction. Examples of the key arrangement include a so-called "QWERTY arrangement" and "AZERTY arrangement".

[Keyboard Cover]

The keyboard cover 11 is disposed on the keyboard body 10 and is composed of a single sheet material that covers the respective input keys 102 configuring the above-described key arrangement. The keyboard cover 11 is not only composed of a single member but also integrally composed of the keyboard body 10.

Figure 2:
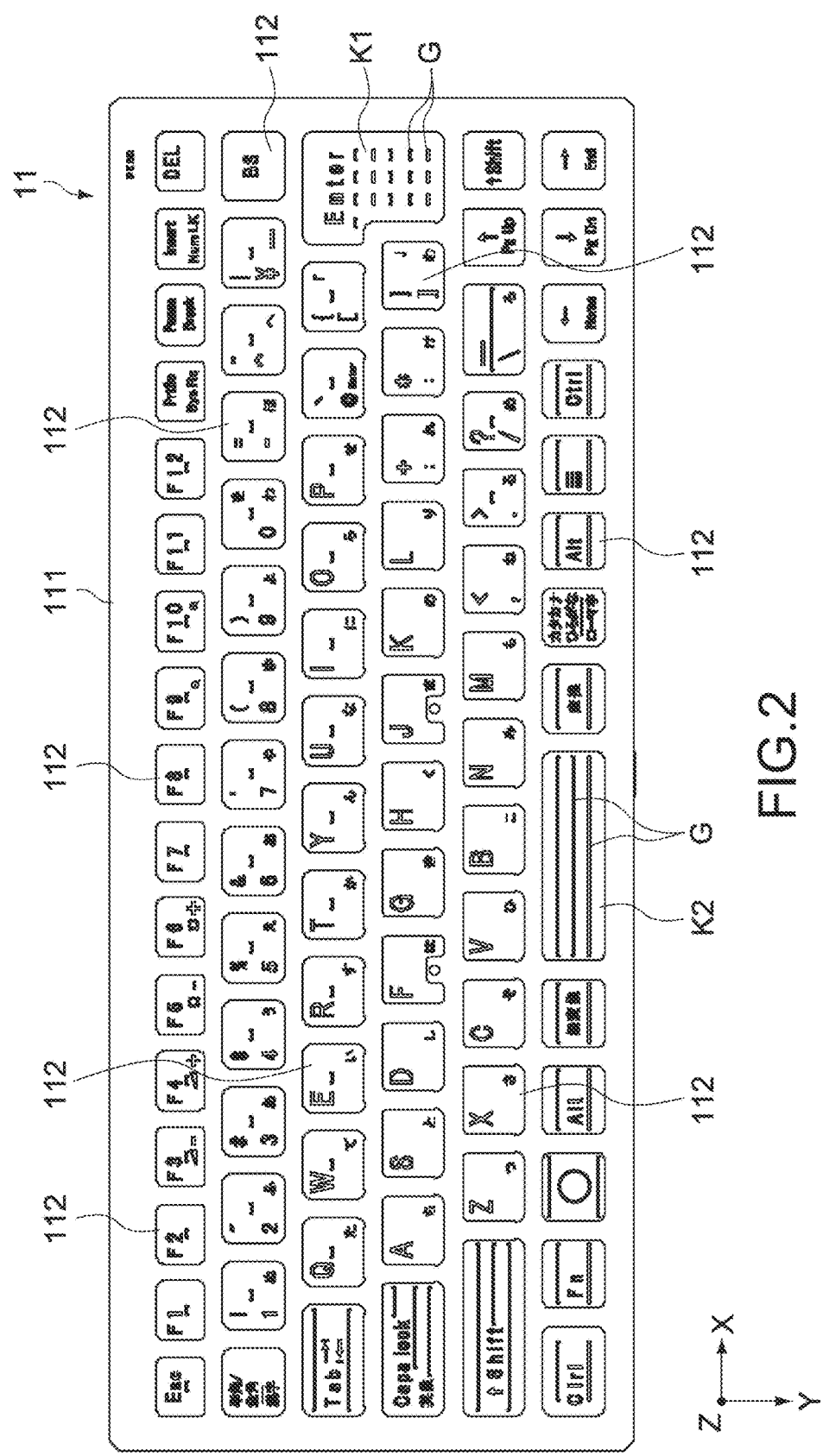
FIG. 2 is a plan diagram of a keyboard cover according to an embodiment of the present technology.

FIG. 2 is a plan diagram of the keyboard cover 11.

The keyboard cover 11 includes a sheet body 111 and convex surfaces 112. The convex surfaces 112 are formed protruded from the surface of the sheet body 111 to upward (a paper surface in FIG. 2). A plurality of the convex surfaces 112 is arranged corresponding to a plurality of the input keys 102 on the key board body 10.

A plurality of the convex surfaces 112 is formed having shapes or sizes corresponding to the respective input keys 102. Some of a plurality of the convex surfaces 112 have protrusions or cutouts at peripherals. Top surfaces of a plurality of the convex surfaces 112 are provided with indications corresponding to key types and predetermined concavo-convex structures.

Figure 3:
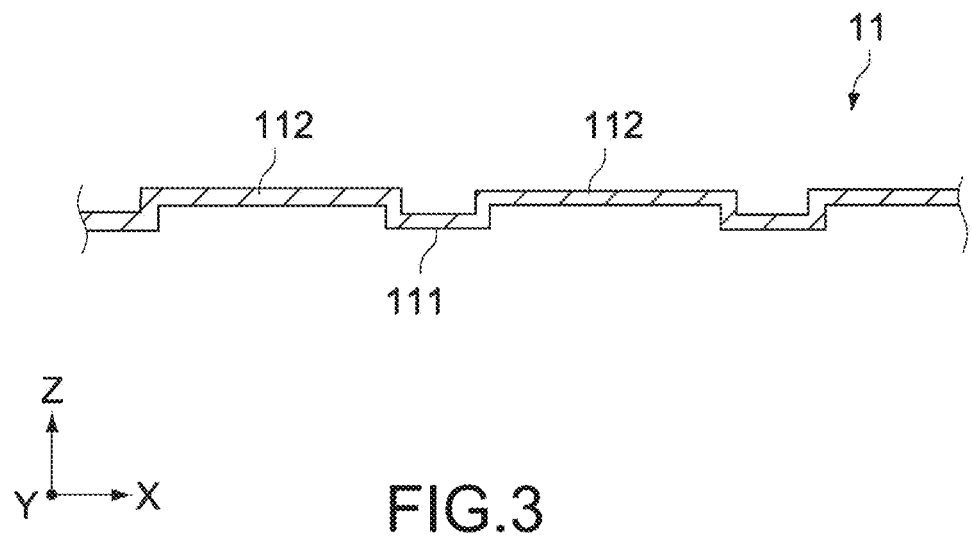
FIG. 3 is a longitudinal cross-sectional diagram of a main part of the keyboard cover.
Figure 4:
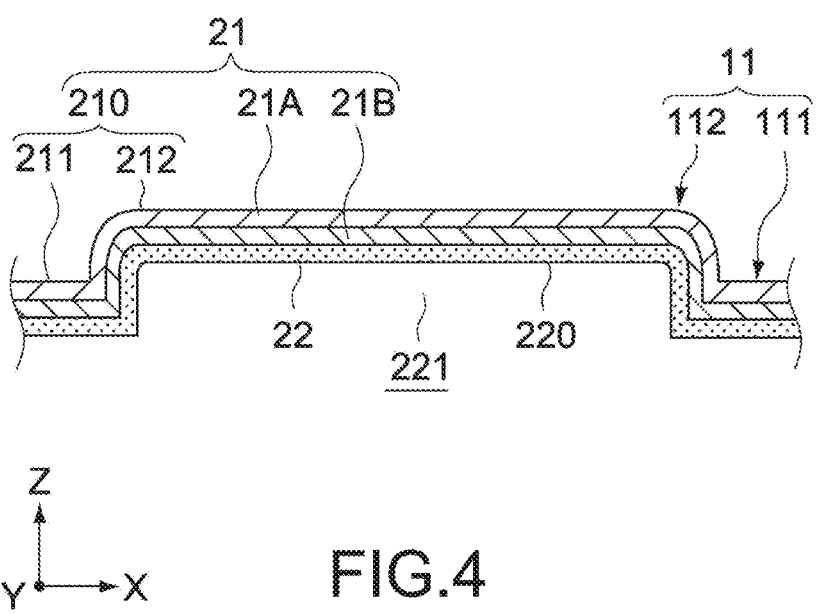
FIG. 4 is a longitudinal cross-sectional diagram of a convex surface of the keyboard cover.

FIG. 3 is a longitudinal cross-sectional diagram of a main part of the keyboard cover 11. FIG. 4 is a longitudinal cross-sectional diagram of the convex surface 112.

The keyboard cover 11 is formed by embossing front and rear surfaces (both surfaces) of the sheet body 111. Respective convex parts on the surface of the keyboard cover 11 correspond to respective concave parts on their rear surface. The respective convex parts and concave parts form the convex surfaces 112.

The keyboard cover 11 is composed of a laminate of a first sheet material 21 and a second sheet material 22. According to the embodiment, the keyboard cover 11 is composed of an artificial leather.

The first sheet material 21 is configured of a deformable material having a surface 210 including the base 211 and a plurality of key tops 212. A plurality of the key tops 212 is arranged corresponding to a plurality of input keys 102 and is configured of roughened top surfaces. A plurality of the key tops 212 is protruded from the base 211 viewed from the surface 210. The base 211 is configured of a smooth surface and connects a plurality of the key tops 212 mutually.

Figure 5:
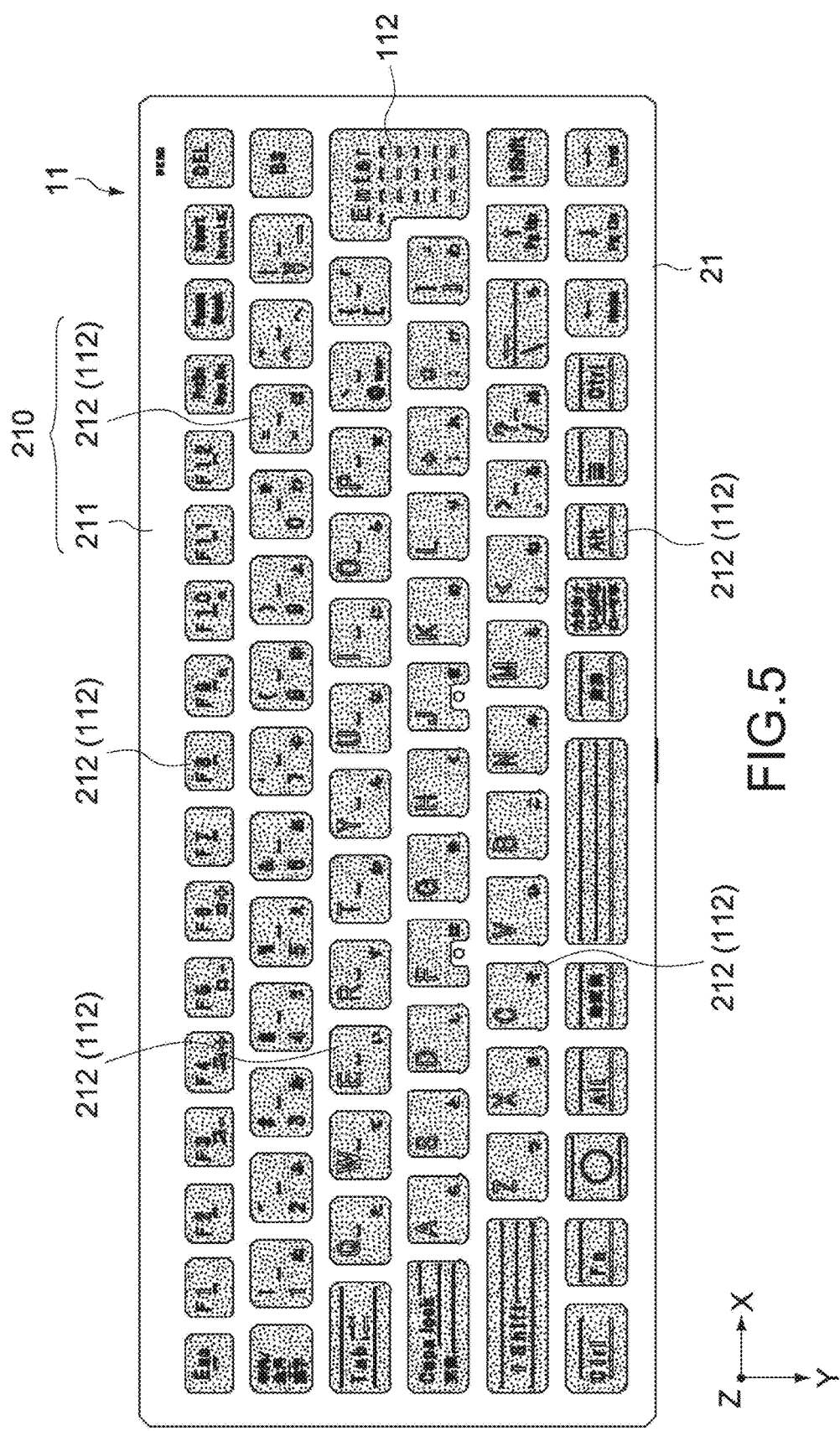
FIG. 5 is a plan diagram showing a difference in surface roughness of a first sheet material in the keyboard cover.

FIG. 5 is a plan diagram showing a difference in surface roughness of the surface 210 of the first sheet material 21. In FIG. 5, shaded areas represent textured surfaces (roughened surfaces) having surface roughness greater than other areas. As shown in FIG. 5, the keyboard cover 11 includes the key tops 212 corresponding to the convex surfaces 112 having the surface roughness greater than the base 211.

The first sheet material 21 includes a surface layer 21A and an intermediate layer 21B. The surface layer 21A is composed of a synthetic resin material forming the surface 210 of the first sheet material 21. On the other hand, the intermediate layer 21B is disposed between the surface layer 21A and the second sheet material 22 and is composed of a thermoplastic resin material.

For the surface layer 21A, a resin sheet having relatively high surface roughness (for example, Ra 10 μm to 100 μm) in an initial state is used. The surfaces of the key tops 212 are formed of the textured surfaces having the surface roughness in the initial state or the surface roughness close to the initial state. On the other hand, the surface of the base 211 is formed of the smoothed surface provided by applying heat and pressure on a mold surface upon embossing. Although the surface roughness of the surface layer 21A in the initial state is not especially limited, a desirable surface roughness is such that a region where the mold surface depresses (the smooth surface) and other regions (the textured surface) can be recognized by touching. For example, the surface roughness of the base 211 is Ra 1 μm to 10 μm, and the surface roughness of the key tops 212 is Ra 10 μm to 50 μm.

According to the embodiment, the surface layer 21A is composed of polyurethane resin. Alternatively, the surface layer 21A may be composed of vinyl based resin or ether based resin, for example. Examples of the vinyl based resin include polyethylene (PE), polypropylene (PP), polyvinyl chloride (PVC), polyvinylidene chloride (PVDF), polyvinyl alcohol (PVA), polyvinyl acetate (PVAc), polyacrylonitrile (PAN), polymetacrylonitrile (PMAN), polymethyl acrylate (PMA), polymethyl methacrylate (PMMA), polyethyl methacrylate (PEMA) and polystyrene (PS). Examples of the ether based resin include polyoxymethylene (POM) and polyoxyethylene (POE). The surface layer 21A may be composed of the thermoplastic resin such as polyethylene terephthalate (PET), polybutylene terephthalate (PBT) and polycarbonate (PC).

The intermediate layer 21B functions as a thermal deformation layer and contributes to the formation of the key tops 212. The thermoplastic resin material of the intermediate layer 21B is not especially limited and may be polyethylene terephthalate (PET), polybutylene terephthalate (PBT), polycarbonate (PC) or the like. By using the thermoplastic resin material of the intermediate layer 21B having a softening point lower than the synthetic resin material of the surface layer 21A, a change in a surface texture of the key tops 212 by heat can be inhibited.

The second sheet 22 covers the rear surface of the first sheet material 21 and has concave parts 220 at regions corresponding to a plurality of the key tops 212 viewed from the rear surface. The second sheet material 22 is composed of a deformable material.

The second sheet material 22 is typically composed of a non-woven fabric. In the embodiment, the non-woven fabric is composed of synthetic resin such as polyester based fiber and polyurethane based fiber. Alternatively, the second sheet material 22 may be composed of a mesh or porous material such as an electrostatic flocking, a sponge substance and a fabric.

The second sheet material 22 forms a space 221 having a predetermined volume within each concave part 220. The size of the space 221 is not especially limited and may be such that each input key 102 of the keyboard body 10 can be housed.

Figure 6:
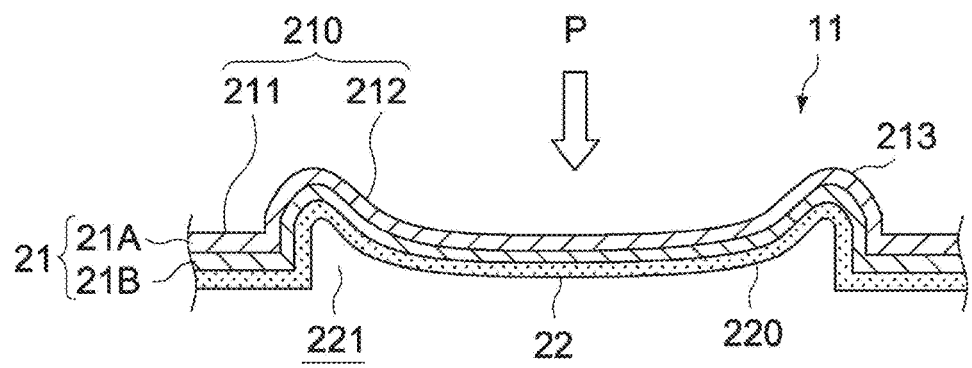
FIG. 6 is a schematic enlarged cross-sectional diagram of a main part of an alternative keyboard cover.

FIG. 6 is a schematic enlarged cross-sectional diagram of a main part of the keyboard cover 11 deformed by a depressing operational force P to the key tops 212. As both of the first sheet material 21 and the second sheet material 22 are composed of the deformable material, once the operational force P is applied to an in-plane center of each key top 212, the key top 212 deforms into the space 221 using peripheral shoulders 213 as supporting points. Also, once the operation force is applied to the shoulder(s) 213, the key top 212 deforms into the space 221 together with the shoulder(s) 213. In this manner, the input key 102 disposed inside of the space 221 or disposed directly under the space 221 is depression-operated.

In the keyboard cover 11 configured as described above according to the embodiment, as the first sheet material 21 includes a plurality of the key tops 212 configured of the roughened surfaces and the base 211 configured of the smooth surface, different touching feels can be imparted to the both. In other words, it allows the user to feel rough on the surface of the key tops 212 and smooth on the surface of the base 211 between the key tops 212. In this manner, the user can easily discriminate key positions, even if a protruded height of the key tops 212 from the base 211 is small.

Also, as a plurality of the key tops 212 is protruded from the base, the peripherals (shoulders 213) of the respective key tops 212 have high rigidity. In this way, the key discrimination and key searching upon touch typing are further improved and mishits upon key searching is prevented.

The second sheet 22 has the concave parts 220 at regions corresponding to a plurality of the key tops 212 viewed from the rear surface of the first sheet material 21. Thus, as shown in FIG. 6, the deformability of the key tops 212 in a depressing direction is improved. It leads to an adequate feedback, even if the protruded height of the key tops 212 is small.

Furthermore, the respective key tops 212 have cushioning properties, thereby providing a soft touching feel, alleviating fatigue caused by a long time use and maintaining comfortable operability. In particular, according to the embodiment, the keyboard cover 11 is composed of an artificial leather, thereby providing excellent scratch resistance, abrasion resistance, chemical resistance and sweat resistance. In addition, the key tops 212 have spring structures for providing click feeling, thereby comfortable push feeling than ever (light work load, small stroke and softness).

The keyboard cover 11 may have non-limiting thickness, for example, 0.1 mm to 1.5 mm, in this embodiment, 0.3 mm to 0.5 mm. Also, the height of the key tops 212 from the surface of the base 211 is not especially limited, can be set in accordance with a kind of the material, a total thickness or the like, and is, for example, 100 µm to 5 mm, in this embodiment, about 500 µm.

Surface shapes of the key tops 212 configuring the convex surfaces 112 are not especially limited, and may be flat shapes or appropriate concavo-convex shapes. In the keyboard cover 11 according to the embodiment, a single straight groove G or a plurality of straight grooves G is provided on the surfaces of the predetermined key tops 212 such as Enter key K1 and Space key K2. Each groove G is deformed such that a groove width is narrowed when the key tops 212 is pressed. This allows to provide the user not only with click feeling due to deformation of the key tops 212 but also with key press operational feeling through a finger nipped by the groove G.

A commercially available artificial leather may be used for the sheet material configuring the key board cover 11. For example, "Clarino™" manufactured by Kuraray Co., Ltd. may be used.

Figure 7:
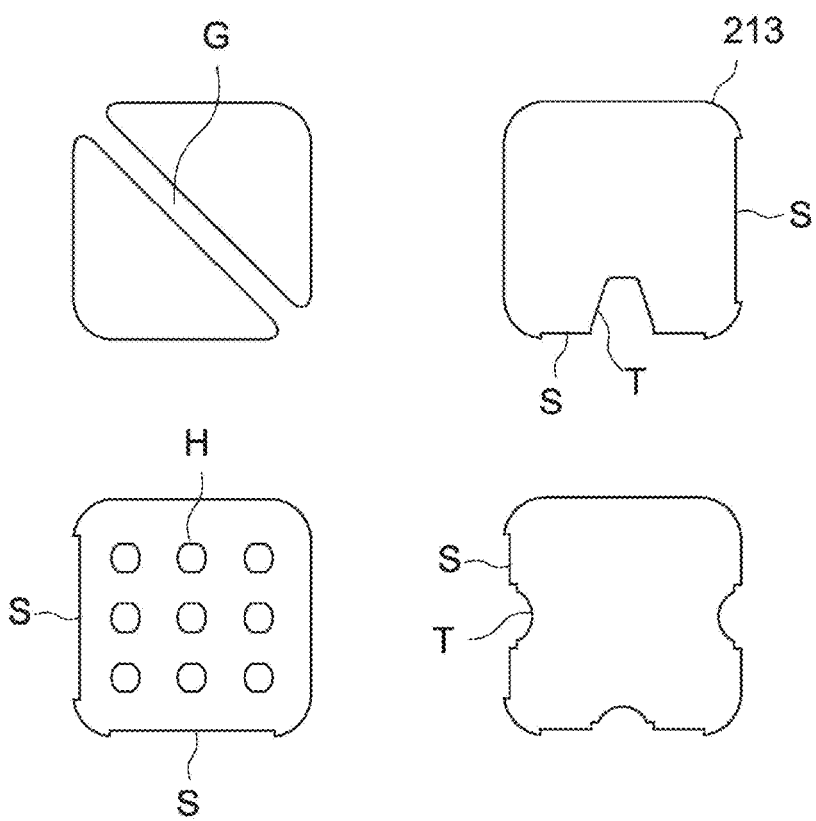
FIG. 7 shows schematic plan diagrams of each surface morphology of a key top of the keyboard cover.
Figure 8:
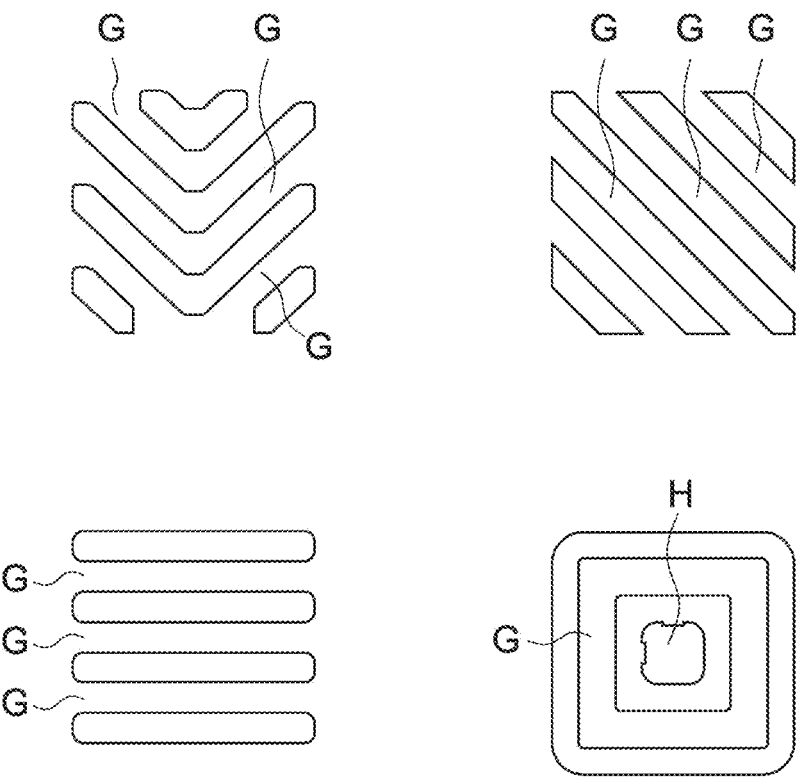
FIG. 8 shows schematic plan diagrams of each surface morphology of a key top of the keyboard cover.

The surface shapes of the key tops 212 are typically formed as substantially rectangle, but are not limited thereto, and may have shapes shown in FIGS. 7 and 8.

An upper left view of FIG. 7 shows a morphology of the key top where the groove G is provided in-plane along a diagonal line. Upper right and lower right views of FIG. 7 show the morphologies of the key tops where each straight edge S is disposed at at least one edge. The formation of the edge S provides the user with a feeling different from that provided by a round shoulder 213. A notch T having a predetermined shape may be disposed at the edge S. The shape of the notch T is not especially limited and may be rectangle or arch as shown. A lower left view of FIG. 7 shows a morphology of the key top where a plurality of circle concave parts H is arranged in-plane. The concave parts H have the functions similar to those of the grooves G and deform upon pressing the key tops to provide the user with a specific touch feeling.

An upper left view of FIG. 8 shows a morphology of the key top where a plurality of substantially V-shaped grooves G is disposed in-plane. Upper right and lower left views of FIG. 8 show morphologies of the key tops where a plurality of straight grooves G in a diagonal direction or a horizontal direction is disposed in-plane. A lower right view of FIG. 8 shows a morphology of the key top having a concave part H disposed at a center and a rectangular circular groove G disposed therearound.

The groove G, the concave part H, the edge S and the notch T formed in the key top 212 can be formed in any manners. The groove G and the like are typically formed using a mold concurrently with embossing of the key tops 212. Accordingly, a mold surface is designed to have an appropriate shape, thereby forming the key tops having the desirable surface morphology.

The above-described morphologies of the key tops may be selected depending on the position, the type or the like of the key tops 212. Typically, an indication such as a characters and a sign on each key top 212 is configured of an ink layer formed by printing but may be formed of the groove G instead.

<Method of Producing Keyboard Cover>

Then, an illustrative method of manufacturing the keyboard cover 11 will be described.

Figure 9:
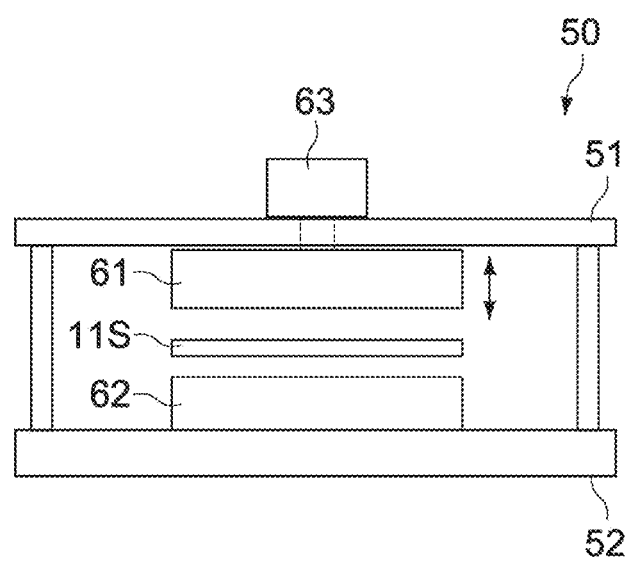
FIG. 9 is a schematic cross-sectional diagram showing an illustrative manufacturing apparatus for the keyboard cover.

FIG. 9 is a schematic cross-sectional diagram showing a heating press apparatus 50 for manufacturing the keyboard cover 11.

The heating press apparatus 50 includes a first mold 61 and a second mold 62 disposed facing to the first mold 61. The first mold 61 is mounted on a stand 51 and the second mold 62 is mounted on a support 52. The first mold 61 is supported by a driving part 63 mounted on the stand 51 and can be moved up and down to the second mold 62. The first mold 61 and the second mold 62 incorporate a heating source such as a heater and a cooling source including a circulation path for a cooling medium.

In the embodiment, the first mold 61 is movable and the second mold 62 is stationary. In contrast, the second mold 62 may be movable. Or, both of the first mold 61 and the second mold 62 may be movable.

Although it is not shown, the heating press apparatus 50 includes a temperature sensor for measuring the temperature of the first and second molds 61, 62 and a pressure sensor for measuring a press pressure of the first mold 61 to the second mold 62.

A lamination sheet 11S to be processed into the keyboard cover 11 is mounted on an upper surface of the second mold 62. The lamination sheet 11S is a laminate of the above-described first sheet material 21 and the second sheet material 22, and is mounted on the second mold 62 with the first sheet material 21 is faced to the first mold 61. The lamination sheet 11S is hot pressed between the first mold 61 and the second mold 62.

Figure 10:
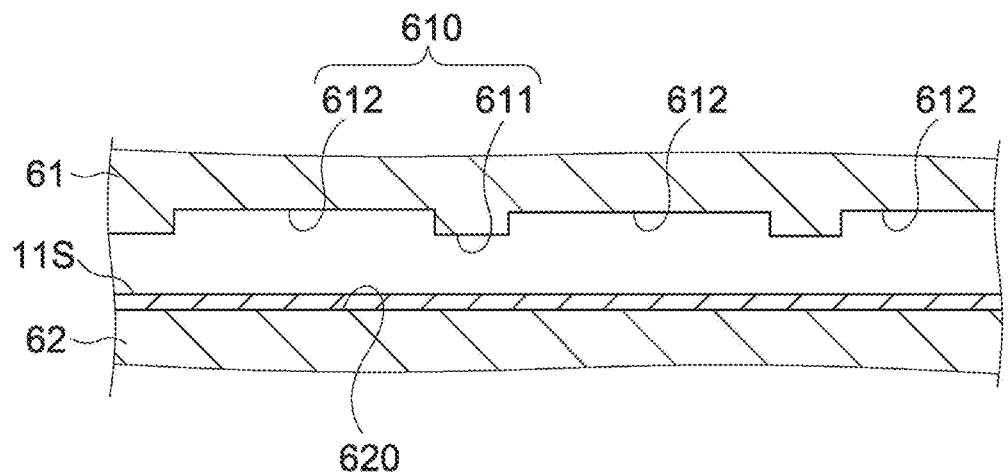
FIG. 10 is a main side cross-sectional diagram schematically showing a mold configuration in the manufacturing apparatus.

FIG. 10 is a main side cross-sectional diagram showing the configuration of the first mold 61 and the second mold 62.

An inner surface 610 of the first mold 61 facing to the surface of the lamination sheet 11S (the first sheet material 21) is configured of a structural surface including a plurality of concave parts 612 and convex parts 611. A plurality of the concave parts 612 is formed corresponding to a keyboard arrangement. In other words, a plurality of the concave parts 612 corresponds to the convex surfaces 112 (key tops 212) of the keyboard cover 11. A plurality of the convex parts 611 corresponds to the mold surface for molding the base 211 connecting the key tops 212.

On the other hand, the second mold 62 is a flat mold. An inner surface 620 of the second mold 62 facing to a rear surface of the lamination sheet 11S (second sheet material 22) is formed flat.

The lamination sheet 11S is mounted on the second mold 62 such that the first sheet material 21 is faced to the first mold 61. The surface of the first sheet material 21 corresponds to the surface 210 of the keyboard cover 11 to be produced and is formed of the textured surfaces having the adequate surface roughness in the initial state as described above. The lamination sheet 11S may be a single sheet where the first sheet material 21 (or the surface layer 21A and the intermediate layer 21B) and the second sheet material 22 are integrated mutually or may be a sheet aggregate where each of which is simply laminated.

Next, a first heating press treatment for the lamination sheet 11S is performed by heating the first and second molds 61, 62 to a first predetermined temperature (for example, 90° C. to 150° C.). In the first heating press treatment, the first mold 61 is lowered by the driving unit 63 and the lamination sheet 11S on the second mold 62 is pressed at a first predetermined pressure (for example, 1 kgf/cm$^2$ to 10 kgf/cm$^2$ (0.098 MPa to 0.98 MPa)).

Figure 11:
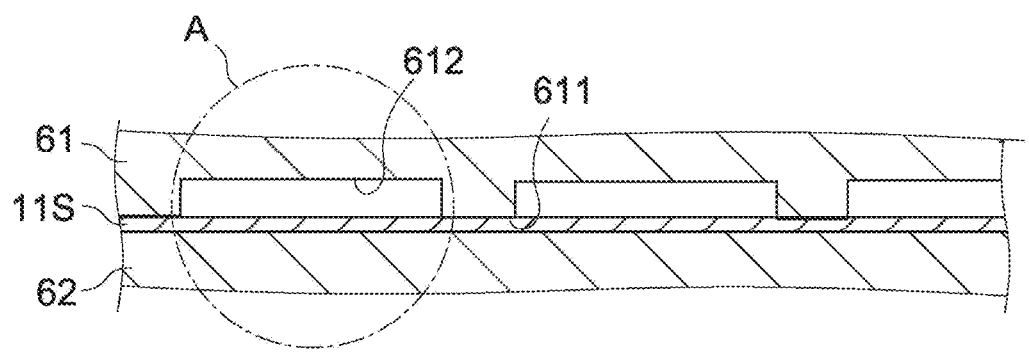
FIG. 11 is a main cross-sectional diagram of a lamination sheet during a first heating press treatment.
Figure 12:
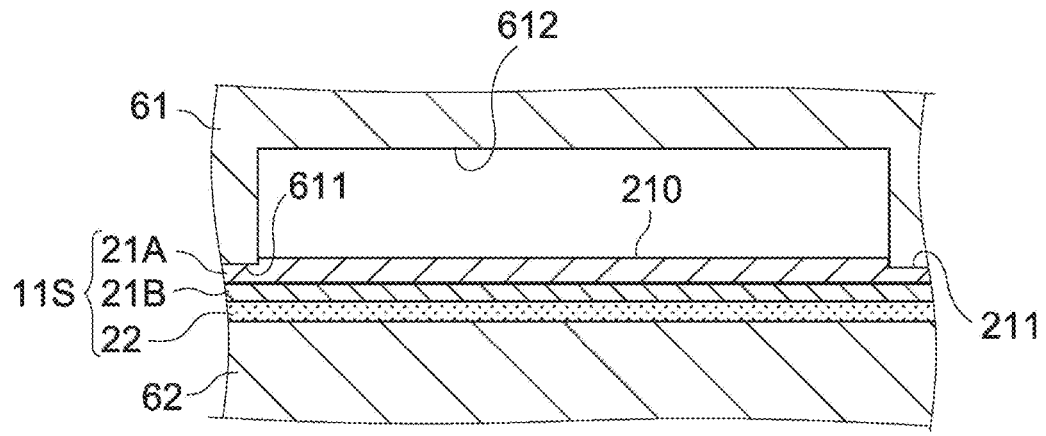
FIG. 12 is an enlarged diagram of a "A" part in FIG. 11.

FIG. 11 is a main cross-sectional diagram of the lamination sheet 11S during the first heating press treatment. FIG. 12 is an enlarged diagram of a "A" part in FIG. 11.

As shown in FIG. 11 and FIG. 12, the surface 210 of the lamination sheet 11S is depressed by a plurality of convex parts 611 of the first mold 61. As a plurality of the convex parts 611 is heated at the above-described predetermined temperature, a surface region of the lamination sheet 11S depressed by the convex parts 611 is smoothed. In this manner, the base 211 configured of a smooth surface is formed. On the other hand, as the other surface region of the lamination sheet 11S faces to each of a plurality of the convex parts 612 of the first mold 61 and is subjected to no heating press, the roughness of the surface in the initial state is maintained.

After the first heating press treatment is continued for a predetermined time (for example, one second to 300 seconds), the press treatment of the lamination sheet 11S by the first and second molds 61, 62 is terminated. Thereafter, a second heating press treatment is performed.

Figure 13:
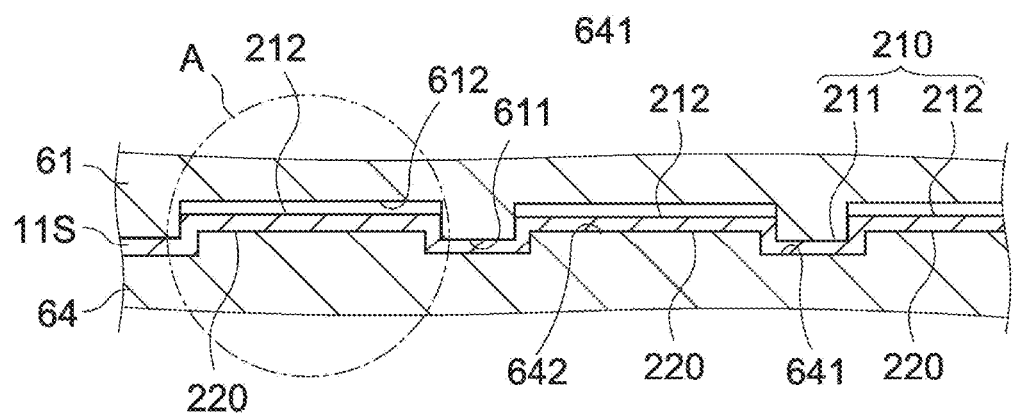
FIG. 13 is a main cross-sectional diagram of the lamination sheet during a second heating press treatment.
Figure 14:
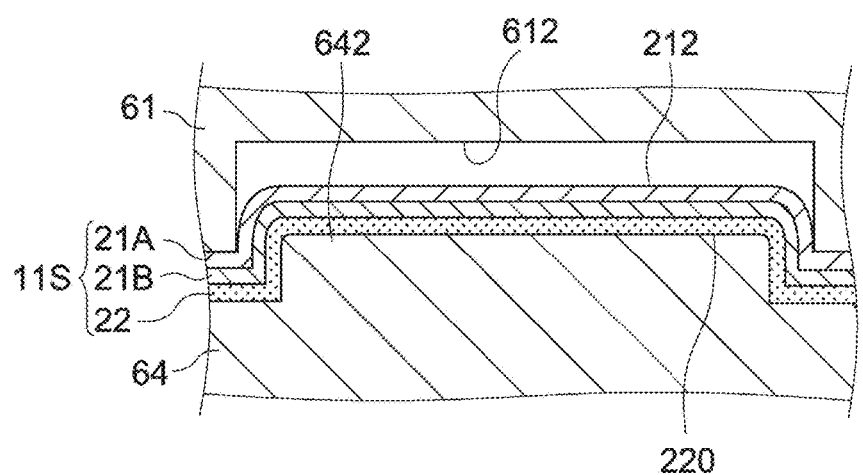
FIG. 14 is an enlarged diagram of the "A" part in FIG. 13.

FIG. 13 is a main cross-sectional diagram of the lamination sheet 11S during the second heating press treatment. FIG. 14 is an enlarged diagram of the "A" part in FIG. 13.

In the second heating press treatment, a second mold 64 is used instead of the flat mold used in the first heating press treatment. The second mold 64 has a structural surface including a plurality of concave parts 641 and a plurality of convex parts 642. A plurality of the concave parts 641 faces to be capable of housing a plurality of the convex parts 611 of the first mold 61, and a plurality of the convex parts 642 faces to be capable of housing a plurality of the concave parts 612 of the first mold.

In the second heating press treatment, the first and second molds 61, 64 to a second predetermined temperature (for example, 90° C. or less). After a mold temperature reaches the second predetermined temperature, the lamination sheet 11S is heated and pressed by the first and second molds 61, 64 at a second predetermined pressure (for example, 1 kgf/cm$^2$ (0.098 MPa) or less at a gauge pressure).

At this time, a relative position between the first mold 61 and the lamination sheet 11S is determined such that a press region of the lamination sheet 11S surface by the first mold 61 becomes the same as a press region of the lamination sheet 11S in the first heating press treatment. On the other hand, a plurality of the convex parts 642 of the second mold 64 presses a rear surface of the lamination sheet 11S to enter into a plurality of concave parts 612 of the first mold 61. In this manner, a plurality of concave parts 220 is formed at the rear surface of the lamination sheet 11S.

According to the embodiment, each convex part 642 of the second mold 64 is set to low so that the surface of each key top 212 does not reach a bottom of each concave part 612 of the first mold 61 upon the second heating press treatment. This inhibits a change of a surface property of the key tops 212 accompanied by the contact with the bottom of the concave part 612 and allows the surface roughness in the initial state to be maintained.

In contrast, the surface of each key top 212 may be in contact with the bottom of each concave part 612 upon the above-described second heating press treatment. In this case, a pressure difference is desirably adjusted not to smooth the surface of each key top 212 upon the contact with the bottom of each concave part 612 by applying heat and pressure, thereby maintaining the textured surface having the surface roughness close to the initial state of each key top 212.

Alternatively, the bottom of each concave part 612 may be roughened to have a predetermined surface roughness. In this case, the surface of each key top 212 is in contact with the bottom of each concave part under pressure upon the thermal deformation, thereby forming the key tops having the desirable surface roughness. A mark is attached for forming the indication on the bottom of each concave part, thereby forming a predetermined indication (character, symbol) on the surface at the same time of the formation of the key tops. Similarly, a convex pattern may be disposed for forming the groove G or the concave part H (see, FIG. 7 and FIG. 8) at the bottom of each concave part.

The above-described second heating press treatment may be performed for a predetermined duration (for example, one second to 300 seconds) while the first and second molds 61, 64 are maintained at the above-described second predetermined temperature, or may be performed only while the above-described second predetermined temperature of the first and second molds 61, 64 is lowered to a third predetermined temperature as described later.

The above-described second heating press treatment is terminated after the first and second molds 61, 64 are cooled to the third predetermined temperature (a softening point of the intermediate layer 21B or less, for example, 60° C.).

As described above, the lamination sheet 11S is embossed to produce the keyboard cover according to the embodiment.

By the above-described production method, the base 211 heated and pressed using the first mold 61 and a plurality of key tops 212 protruded from the base 211 entered into the concave parts 612 of the first mold 61 are formed on the surface 210 of the first sheet material 21. The surface of the base 211 is smoothed by applying heat and pressure on the first mold 61 as compared to the surfaces of the key tops 212. This allows the production of the keyboard cover 11 being excellent in the key discrimination. In addition, as the deformability of the key tops 212 in a depressing direction is improved, the keyboard cover 11 providing an adequate feedback upon inputting can be produced. While the present technology is described herein with reference to illustrative embodiments for particular applications, it should be understood that the present technology is not limited thereto. It should be appreciated that variations and modifications may be made without departing from the scope of the present technology.

For example, in the embodiments, the first sheet material 21 of the keyboard cover 11 has a two-layered structure of the surface layer 21A and the intermediate layer 21B, but it not limited thereto, and may have a single layer structure including a thermoplastic resin material.

Furthermore, in the embodiments, the key tops 212 of the keyboard cover 11 are formed in a mesa structure (a shape having steep surrounding and a flat top), but is not limited thereto, and may be formed in a curved shape such as hemisphere or other stereoscopic shape such as a cone.

The present technology may have the following configurations.

(1) A keyboard cover, including:
a first sheet material having a surface including a plurality of key tops configured of roughened surfaces and a base configured of a smooth surface connecting a plurality of the key tops, a plurality of the key tops being projected from the base viewed from the surface; and
a second sheet material covering a rear surface of the first sheet material and having concave parts corresponding to a plurality of the key tops viewed from the rear surface.

(2) The memory element according to (1) or (2) above, in which
the first sheet material includes
a surface layer composed of a synthetic resin material forming the surface, and
an intermediate layer disposed between the surface layer and the second sheet material and composed of a thermoplastic resin material.

(3) The memory element according to (1) or (2) above, in which
a plurality of the key tops includes at least one groove.

(4) The memory element according to any one of (1) to (3) above, in which
the second sheet material is composed of a non-woven fabric.

(5) An electronic apparatus, including:
a keyboard body including a plurality of input keys; and
a keyboard cover, including:
a first sheet material having a surface including a plurality of key tops configured of roughened surfaces and a base configured of a smooth surface connecting a plurality of the key tops, a plurality of the key tops being projected from the base viewed from the surface; and
a second sheet material covering a rear surface of the first sheet material and having concave parts corresponding to a plurality of the key tops viewed from the rear surface.

It should be understood by those skilled in the art that various modifications, combinations, sub-combinations and alterations may occur depending on design requirements and other factors insofar as they are within the scope of the appended claims or the equivalents thereof.

What is claimed is:

1. A keyboard cover, comprising:
a first sheet material having a surface including a plurality of key tops configured of roughened convex surfaces and a base configured of a smooth surface connecting a plurality of the key tops, a plurality of the key tops being projected from the base viewed from the surface; and
a second sheet of porous material covering a rear surface of the first sheet material and having concave parts corresponding to a plurality of the key tops viewed from the rear surface;
wherein the first sheet material includes:
a surface layer composed of a synthetic resin material forming the surface, and
an intermediate layer disposed between the surface layer and the second sheet material and composed of a thermoplastic resin material;
wherein a plurality of the key tops in the first sheet material includes at least one groove disposed along a diagonal line in a plane of the key tops.

2. An electronic apparatus, comprising:
a keyboard body including a plurality of input keys; and
a keyboard cover, including:
a first sheet material having a surface including a plurality of key tops configured of roughened convex surfaces and a base configured of a smooth surface connecting a plurality of the key tops, a plurality of the key tops being projected from the base viewed from the surface and a plurality of the key tops in the first sheet of material includes at least one groove; and
a second sheet of porous material covering a rear surface of the first sheet material and having concave parts corresponding to a plurality of the key tops viewed from the rear surface;
wherein the first sheet material includes:
a surface layer composed of a synthetic resin material forming the surface, and
an intermediate layer disposed between the surface layer and the second sheet material and composed of a thermoplastic resin material,
wherein a plurality of the key tops in the first sheet material includes at least one groove disposed along a diagonal line in a plane of the key tops.

* * * * *